(12) United States Patent  
Aleyraz et al.

(10) Patent No.: US 7,446,501 B2  
(45) Date of Patent: Nov. 4, 2008

(54) INTEGRATED FUEL CELL CONTROLLER FOR DEVICES

(75) Inventors: Zeev Aleyraz, Herzelliya (IL); Zohar Peleg, Hod-Asharon (IL); Gennadi Finkelshtain, Shoham (IL)

(73) Assignee: More Energy Ltd., Yehud (IL)

( * ) Notice: Subject to any disclaimer, the term of this patent is extended or adjusted under 35 U.S.C. 154(b) by 403 days.

(21) Appl. No.: 10/803,900

(22) Filed: Mar. 19, 2004

(65) Prior Publication Data

US 2005/0206342 A1    Sep. 22, 2005

(51) Int. Cl.  
    *H01M 10/44*    (2006.01)
(52) U.S. Cl. .................. 320/101; 320/150; 320/136; 429/12; 429/24; 429/26
(58) Field of Classification Search ................ 320/136, 320/150, 140; 429/20, 24, 26  
See application file for complete search history.

(56) References Cited

U.S. PATENT DOCUMENTS

| | | | | |
|---|---|---|---|---|
| 4,563,630 A | * | 1/1986 | Woodward et al. | 322/8 |
| 6,160,382 A | * | 12/2000 | Yoon et al. | 320/136 |
| 6,255,008 B1 | * | 7/2001 | Iwase | 429/9 |
| 6,858,335 B2 | * | 2/2005 | Schmidt et al. | 429/13 |
| 6,908,500 B2 | * | 6/2005 | Fisher et al. | 429/72 |
| 6,917,179 B2 | * | 7/2005 | Komatsu et al. | 361/51 |
| 6,987,163 B2 | * | 1/2006 | Cabasso et al. | 528/327 |

* cited by examiner

*Primary Examiner*—Adolf Berhane  
*Assistant Examiner*—Samuel Berhanu  
(74) *Attorney, Agent, or Firm*—Greenblum & Bernstein, P.L.C.

(57) ABSTRACT

Power unit for an electronic device and process for control and regulation of an electronic device powered by a fuel cell. Power unit includes a fuel cell having a low output voltage between 0.3 and 1 V, and a conversion device coupled to the fuel cell to convert an input voltage as low as 0.3 V to a higher output voltage to operate the electronic device.

2 Claims, 7 Drawing Sheets

INTEGRATED FUEL CELL CONTROLLER FOR DEVICES

BACKGROUND OF THE INVENTION

1. Field of the Invention

The present invention is directed to an interface device and process for controlling a fuel cell and a device powered by the fuel cell. Moreover, the device communicates with both the fuel cell and the powered device.

2. Discussion of Background Information

An electrochemical fuel cell (FC) is a device that converts the energy of a chemical reaction into electricity. Although fuel cells are increasingly gaining acceptance as electrical power sources, there are technical difficulties that prevent the widespread use of fuel cells in many applications, especially mobile and portable applications. In operation, several problems have been observed, including performance degradation in long term low load condition, fuel cell heating occurring as a result of power dissipation on the fuel cell inner impedance, low fuel cell voltage, which is usually is the range of 0.3V-1, decomposing of fuel and electrodes in high ambient temperature, decreasing of fuel cell capacity and energy as a result of low ambient working temperature, and inability of fuel cell to provide full power as a result of low oxygen concentration on the FC cathode. Further, no communication between the FC and the powered device, such that the fuel cell is unaware of the powered device's requirements and vice versa, and changes in the load reduce efficiency are also observed problems in the known art.

Known fuel cells are not capable of being operated under different load conditions without shortened life or of being operated with maximum efficiency. Thus, it would be advantageous to enlarge fuel cell efficiency.

To operate known fuel cells under load, it is generally necessary to the heat the fuel cell, which requires an additional expenditure of energy. Also, when known fuel cells are operated under low ambient working temperature, fuel cell capacity and energy are undesirably decreased.

Another drawback of known fuel cells is that when operated under low oxygen concentration on the fuel cell cathode, the fuel cell is unable to provide power.

Further, while there is potential for using fuel cells as the power source in portable devices, e.g., electronic devices such as cellular telephones, cameras, portable computers, PDAs, audio devices, video devices, medical devices, etc., known fuel cells are not generally able to provide power in a form of higher, regulated and changeable output voltage that is necessary for most portable devices. Moreover, known interfaces do not provide adequate communication between the fuel cell and the portable device and/or between the fuel cell and a host computer.

A further drawback of known fuel cells is that, in high ambient temperature, the undesirable decomposition of fuel and electrodes occurs.

SUMMARY OF THE INVENTION

The present invention is directed to power unit that utilizes a fuel cell as its energy source. The power unit also includes a control unit that acts as an interface between the fuel cell and the device to be powered, e.g., a portable electronic device such as a cellular phone, camera, portable computer, PDA, audio device, video device, medical device, etc. It is contemplated that the powered device may have an energy capacity of up to about 150 Wh.

According to the invention, the power unit advantageously utilizes an individual fuel cell, such that no stacking of multiple fuel cells is necessary. As a result, the output voltage from the power source/fuel cell is very low, e.g., between 0.3-1V, and the current is very high.

The fuel cell utilized by the power unit of the present invention is very sensitive to surrounding environmental conditions, e.g., high or low temperature, over or under load, low oxygen percentage in the air, and fuel concentration, such that the power unit monitors changes in the fuel cell output due to these changes in order to maintain operation of the fuel cell at optimum efficiency.

The control unit acts as an interface between any device to be powered and the fuel cell in such a manner that maximum energy in maximum efficiency will be driven out from the fuel cell. Moreover, according to the invention, the control unit can communicate directly with the powered device controller, such that the control unit and powered device can pass information and commands to each other. In this manner, the powered device can request from the control unit momentary power needs, specifically in mode transits. Further, the control unit can notify the powered device about special states, e.g., difficult environmental conditions that affect the fuel cell power.

Moreover, the control unit of the present invention can be used to communicate with a host computer for data collection, software replacing and other purposes.

As noted above, an individual fuel cell delivers energy at a low voltage, typically 0.3-1V. However, in order to use such a fuel cell in the above-noted devices, the voltage must be converted to a higher voltage, in the range of, e.g., 1.5-12V. To provide this higher voltage, the instant invention includes a DC/DC converter designed to convert the very low voltage of the fuel cell to the required voltage for operating the powered devices.

In the event that the output voltage of the DC/DC converter is too low, the instant invention further includes an up converter arranged to boost the DC/DC converter output voltage to the required output voltage for the powered device. In this manner, the efficiency of the power unit is improved.

To provide supplementary output power, the present invention also includes a backup battery (rechargeable battery). In particular, the backup battery is utilized in order to allow fuel cell to cool down when its temperature becomes too high. In this manner, the present invention is able to prevent decomposition of the fuel cell and the electrodes. Further, when the ambient temperature becomes too low or when there is low oxygen concentration on the fuel cell cathode, the power unit allows the backup battery to supply the required voltage and current to the powered device.

The present invention further improves efficiency of the power unit through the use of a backup battery charger, which stores excess fuel cell energy to the backup battery. In the event that the backup battery is not able to supply the output voltage required by the powered device, the instant invention also includes a battery up converter arranged to convert the backup battery voltage to the required output voltage.

Efficiency can be further improved through the use of a heater positioned to heat the fuel cell via current from the backup battery. Further, a temperature sensor, coupled to the control unit, is provided to measure the fuel cell temperature, so that the control unit can compensate for low or high fuel cell temperature measurements.

The power unit also includes an on/off switch to disconnect the powered device and a dump resistor to absorb redundant power from the fuel cell to prevent stand by effect. In this manner, the power unit life expectancy can be prolonged.

The control unit of the present invention includes a communication interface arranged to enable communication between the control unit and the powered device or between the control unit and a host computer, such as a PC. In this manner, information about the fuel cell and environment state can be passed to the powered device, which can act according to it. Further, the powered device can notify the control unit about momentary power needs, which allows the control unit to be prepared for them. Furthermore, the control unit and the powered device can pass information and commands to each other in order to improve their functionality. The communication with the host computer can be used to download software to the control unit, to change parameters in the control unit and to log operation statuses, including error states.

Visual indicators (such as LEDs) can be provided to show the status of the power unit. Such indicators can also be used to alert the user to take action, e.g., exchanging the fuel in the fuel cell with fresh fuel.

The control unit is a part of the power unit and is responsible for the operation of power unit, including control of proper fuel cell operation and communicating with the powered device or host computer. Further, the control unit controls the DC/DC conversion, system monitoring and control, power regulation and compensation, fuel cell output regulation (voltage, current and power), temperature regulation and communication. A rechargeable Li-Ion battery (Backup battery) and related circuitry are included for the power compensation and temperature regulation functions.

The present invention is directed to a power unit for an electronic device that includes a fuel cell having a low output voltage between 0.3 and 1 V, and a conversion device coupled to the fuel cell to convert an input voltage as low as 0.3 V to a higher output voltage to operate the electronic device.

According to a feature of the instant invention, the conversion device can include a DC/DC converter. The conversion device may further include an up converter coupled to the DC/DC converter in order to boost an output voltage of the DC/DC converter to the higher voltage to operate the electronic device.

In accordance with another feature of the invention, the power unit can further include a backup battery coupled to the conversion device in order to at least supplement the output of DC/DC converter. A battery up converter can be coupled to the backup battery to boost a voltage of the backup battery to a necessary level. A heating device, which can be coupled to the backup battery and to the fuel cell, is structured and arranged to heat the fuel cell. A temperature measuring device may be coupled to the fuel cell to monitor fuel cell temperature.

According to still another feature of the invention, a dump resistor, which can be coupled to the conversion device, is structured and arranged to consume additional load from the fuel cell.

A control unit may be structured and arranged to control operation of the conversion device. Further, a backup battery can be coupled to the conversion device in order to at least supplement the output of DC/DC converter, and a battery up converter may be coupled to the backup battery to boost a voltage of the backup battery to a necessary level. The control unit can be coupled to the backup battery and to the battery up converter in order to control and regulate the energy supplied to the electronic device. Moreover, a heating device, which can be coupled to the backup battery and to the fuel cell, is structured and arranged to heat the fuel cell, and a temperature measuring device may be coupled to the fuel cell to monitor fuel cell temperature. The control unit can also be coupled to the heating device and to the temperature measuring device in order to control and regulate the temperature of the fuel cell. Still further, a dump resistor, which can be coupled to the conversion device, is structured and arranged to consume additional load from the fuel cell. The control unit may be coupled to the dump in order to control and regulate operation of the converter. The control unit can include an A/D converter structured to receive voltage and current data from the conversion device, a D/A converter structured to output reference voltage and current levels, and a data processor arranged to receive data from the A/D converter and to forward data to the D/A converter. A charger interface may be coupled to the data processor, and a battery monitor, which can be coupled to the charger interface, is structured and arranged to collect battery data. Further still, a host interface can be structured to provide two-way communication between the control unit and the electronic device.

According to another feature of the invention, the fuel cell can be an individual fuel cell.

The present invention is directed to a power unit for an electronic device that includes a fuel cell, a control unit structured and arranged to control and regulate the fuel cell, and a communication interface structured to provide two-way communication between the control unit and the electronic device.

In accordance with a feature of the invention, the fuel cell can be an individual fuel cell having a low voltage of between 0.3 and 1V, and the power unit can further include a conversion device coupled to the fuel cell to convert an input voltage from the fuel cell as low as 0.3 V to a higher output voltage to operate the electronic device. The conversion device can include a DC/DC converter. Further, the conversion device may include an up converter coupled to the DC/DC converter in order to boost an output voltage of the DC/DC converter to the higher voltage to operate the electronic device. A backup battery may be coupled to the conversion device in order to at least supplement the output of DC/DC converter. A battery up converter can be coupled to the backup battery to boost a voltage of the backup battery to a necessary level. Moreover, the control unit can be coupled to the conversion device, backup battery, and battery up converter in order to control and regulate the energy supplied to the electronic device. A heating device, which may be coupled to the backup battery and to the fuel cell, is structured and arranged to heat the fuel cell. A temperature measuring device can be coupled to the fuel cell to monitor fuel cell temperature. The control unit can be coupled to the heating device and to the temperature measuring device in order to control and regulate the temperature of the fuel cell. Still further, a dump resistor, which can be coupled to the conversion device, is structured and arranged to consume additional load from the fuel cell. The control unit can be coupled to the dump in order to control and regulate operation of the converter.

In accordance with still another feature of the invention, the control unit can include an A/D converter structured to receive voltage and current data from the conversion device, a D/A converter structured to output reference voltage and current levels, and a data processor arranged to receive data from the A/D converter and to forward data to the D/A converter. Further, a charger interface can be coupled to the data processor, and a battery monitor may be coupled to the charger interface, which is structured and arranged to collect battery data. A host interface can be structured to provide two-way communication between the control unit and the electronic device.

Further, the fuel cell can be an individual fuel cell.

The present invention is directed to a process for control and regulation of an electronic device powered by a fuel cell.

The process includes coupling a fuel cell to an electronic device, and boosting an output voltage of the fuel cell as low as 0.3V to a level required by the electronic device.

In accordance with another feature of the invention, the boosting of the output voltage can be performed by a DC/DC converter. Further, the boosting of the output voltage can further include boosting the output voltage of the DC/DC converter to the higher voltage via an up converter to operate the electronic device. The process can also include supplementing the output of the DC/DC converter with a backup battery. Further, the process can also include boosting a voltage of the backup battery to a necessary level via a battery up converter. The process may also include heating the fuel cell via the backup battery. The process can also include monitoring fuel cell temperature.

According to another feature of the invention, the process can include consuming additional load from the fuel cell via a dump resistor coupled to the conversion device that is structured and arranged to consume additional load from the fuel cell.

The process may also include controlling the individual components of the power unit via a control unit. Further, the process can include establishing two-way communication between the control unit and the electronic device.

The instant invention is also directed to a process for control and regulation of an electronic device powered by a fuel cell. The process includes coupling a fuel cell to an electronic device, controlling operation of the fuel cell via a control unit, and establishing two-way communication between the control unit and the electronic device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
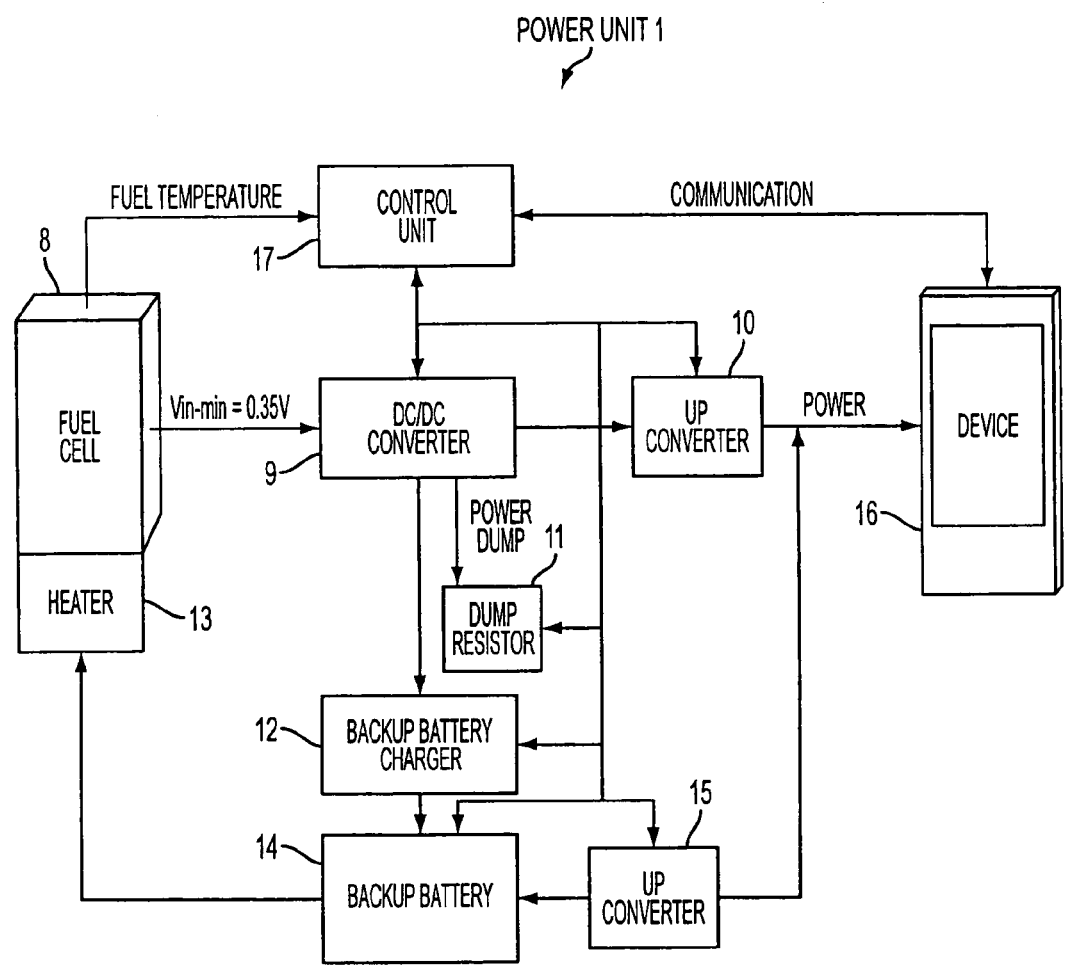
FIG. 1 schematically illustrates an exemplary arrangement of the power unit according to the invention.
Figure 2A:
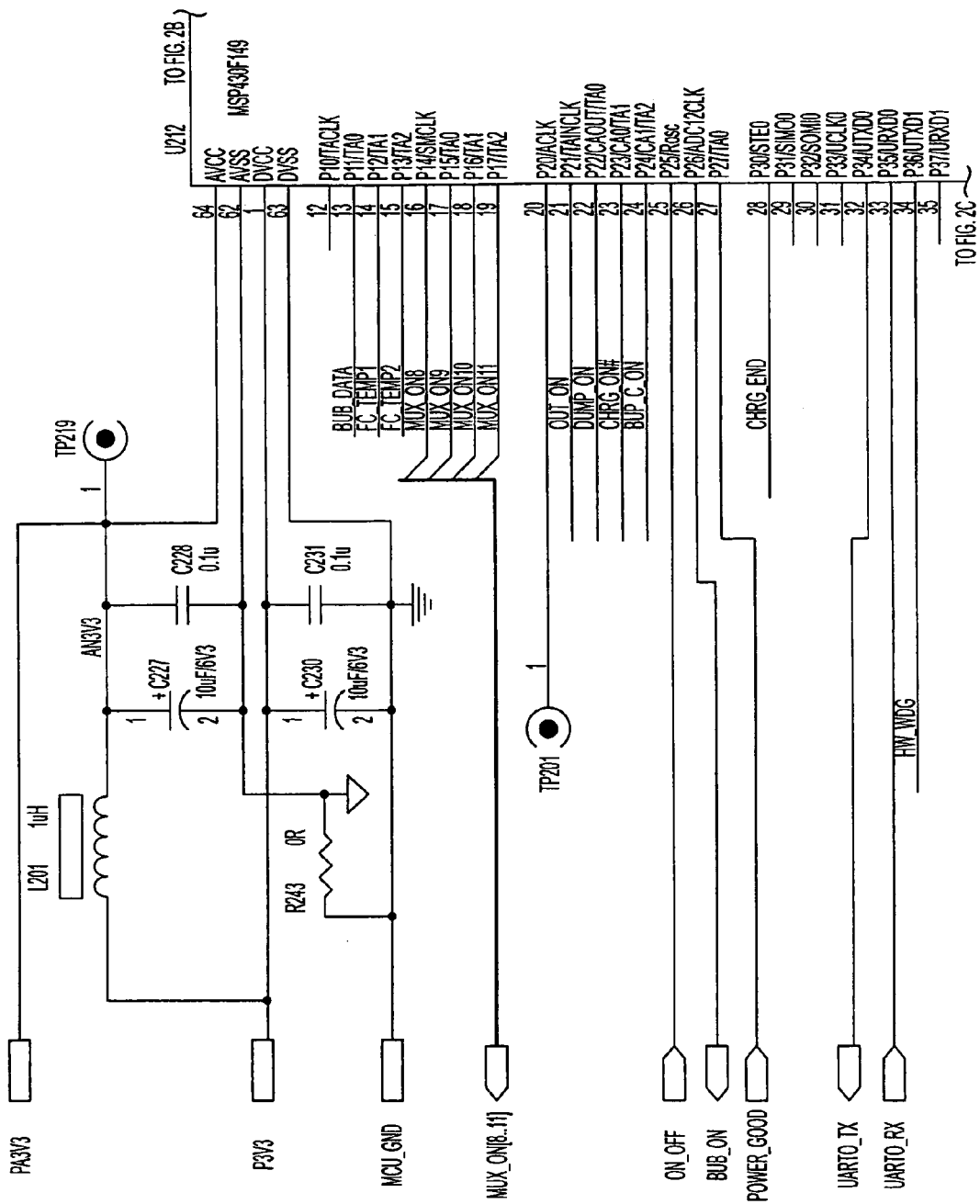
FIGS. 2A-2D schematically illustrate an exemplary arrangement of the DC/DC converter depicted in FIG. 1.
Figure 2B:
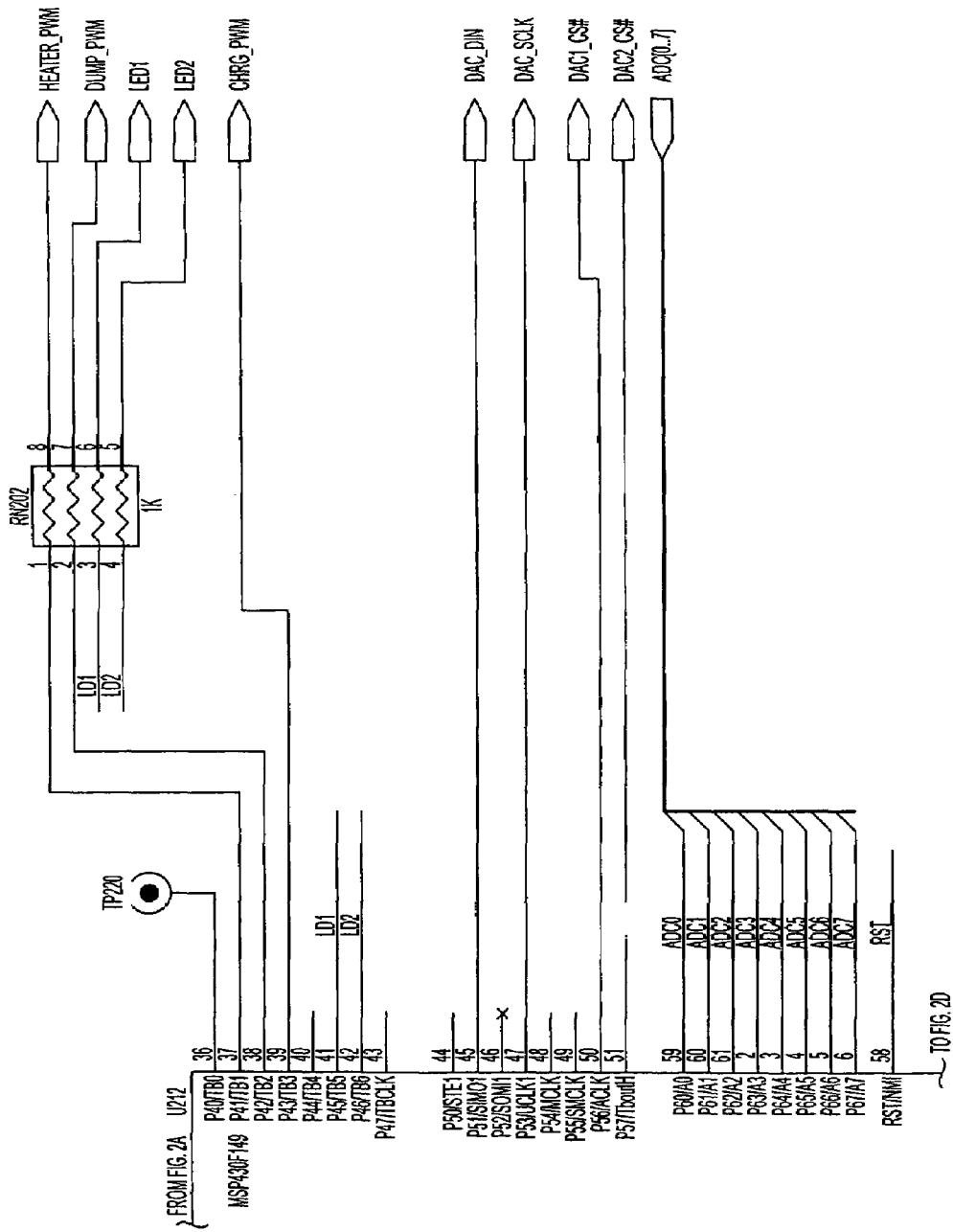
Figure 2C:
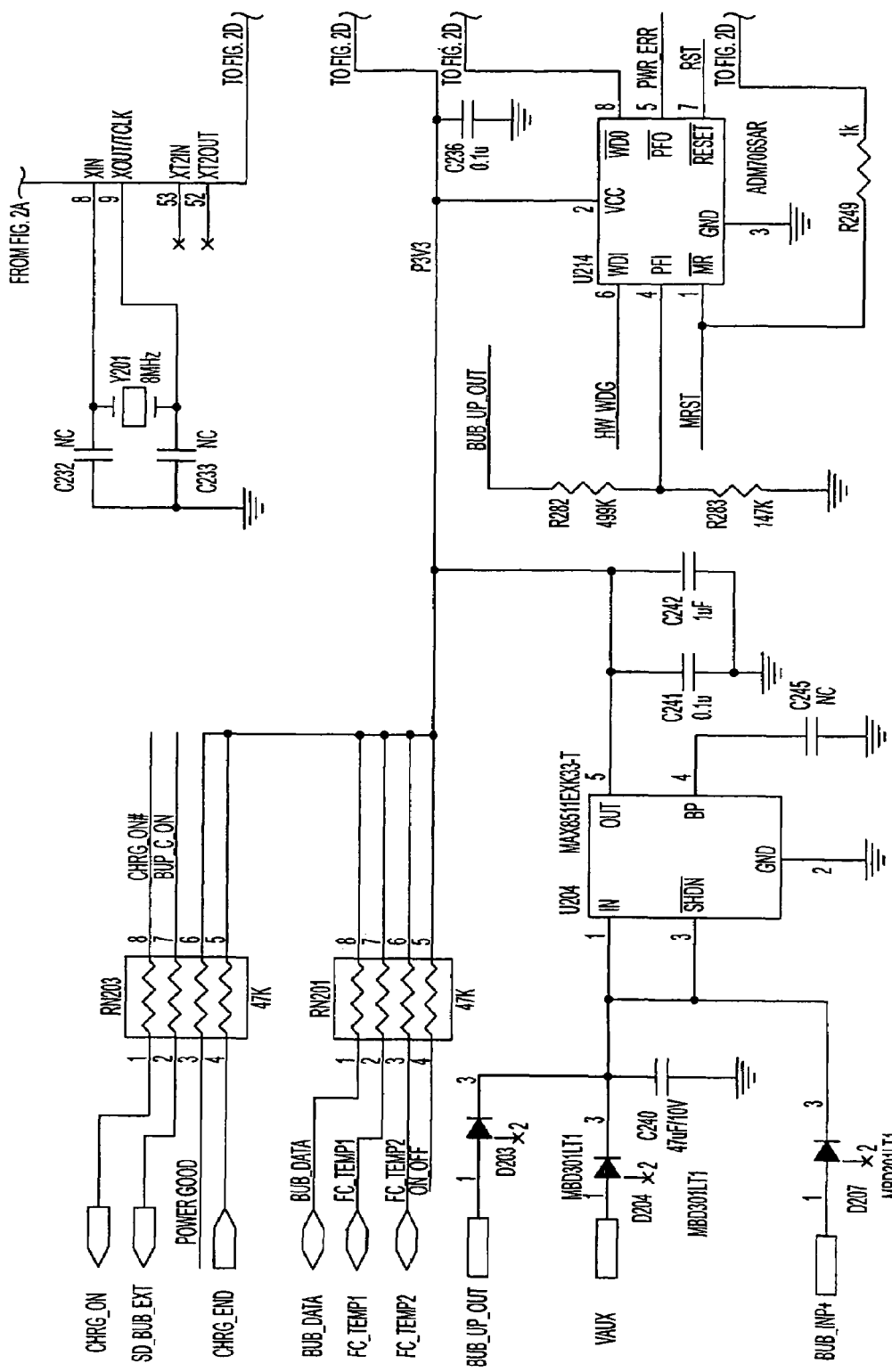
Figure 2D:
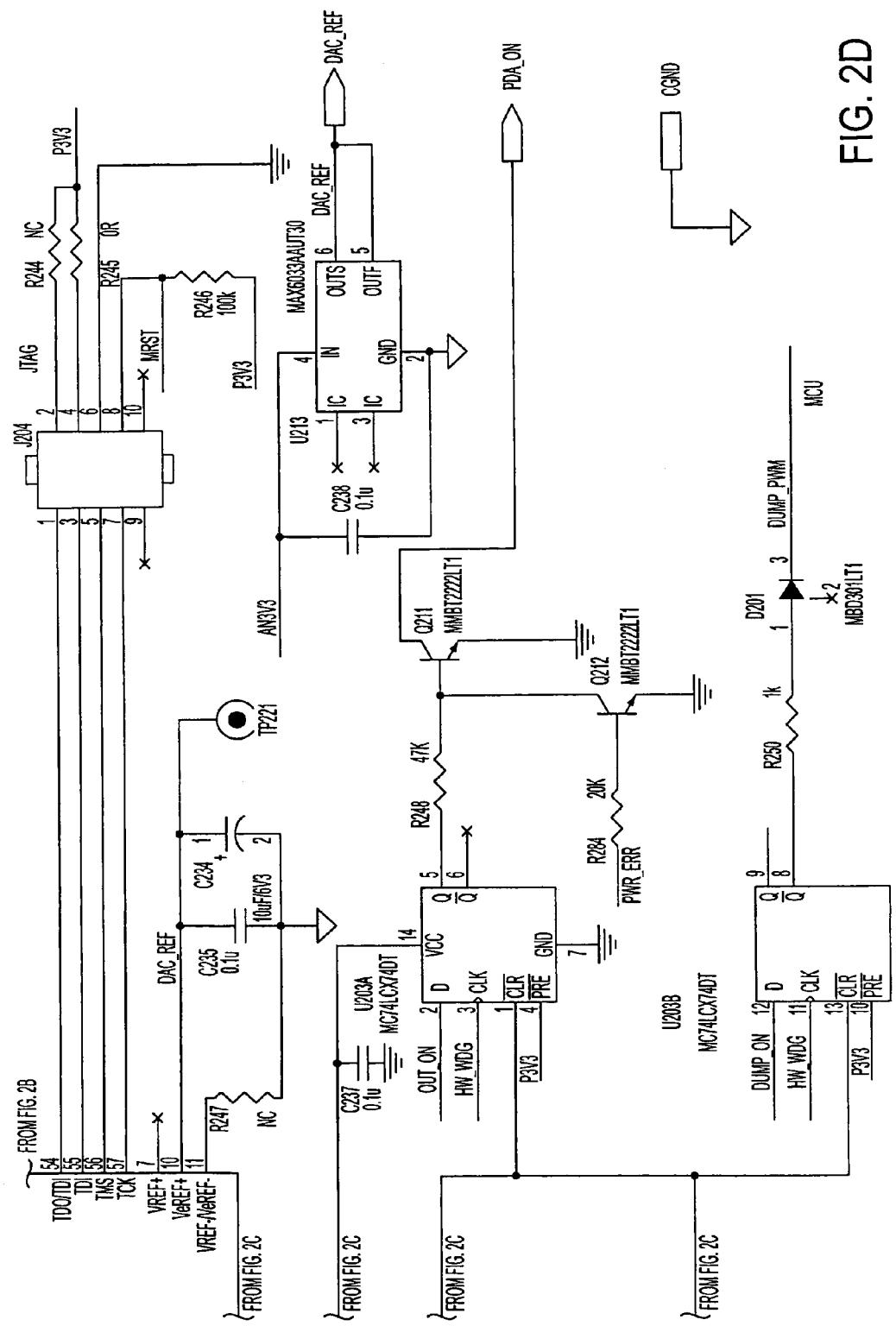

As illustrated in FIG. 1, power unit 1 is shown coupled to a powered device 16, which can be a portable electronic device, e.g., a cellular phone, camera, portable computer, PDA, audio device, video device, medical device, etc. As shown, power unit 1 includes a fuel cell 8 coupled to powered device 16. According to the invention, power unit 1 is structured to control the fuel cell voltage, current and power as a function of the load from operation of powered device 16 and of optimal working conditions of fuel cell 8, e.g., voltage, current, power, and temperature. As will be discussed below, the present invention regulates only one of the voltage, current and power parameters at any given time.

In addition to supplying power to powered device 16, power unit 1 regulates output voltage, output current limit function, output short cut protection, output reverse current disabling and more functions.

In the exemplary embodiment of the invention, an individual fuel cell is utilized, i.e., not a stacked fuel cell, such that the output voltage of fuel cell 8 is very low, e.g., between 0.3 and 1V. Because the powered unit is likely to require a much higher voltage in order to properly operate, the output voltage of fuel cell 8 must be boosted to the voltage necessitated by powered device 16, e.g., between 1.5 and 12V.

In order to provide the necessary boost, power unit 1 further includes a DC/DC converter 9 coupled to fuel cell 8. In contrast to conventional DC/DC converters, DC/DC converter 9 can operate to boost the very low input voltage supplied by fuel cell 8, i.e., as low as 0.3 or 0.4 V. FIGS. 2A-2D schematically illustrate DC/DC converter 9 according to the invention, such that the very low voltage output of an individual fuel cell can be adequate to power powered device 16. DC/DC converter 9 has an input voltage range ($V_{in}$) between 0.3 and 1.1V, an output voltage ($V_{out}$) of 5±0.1V, and an output voltage adjustment of 3-5V. Moreover, DC/DC converter 9 can be adjusted to output powers of 1.5 W, 2.5 W, or 5 W. Further, to increase power output, two DC/DC converters can be arranged in parallel, thereby doubling the output power.

In the event that the voltage output of DC/DC converter 9 is insufficient to provide the necessary requirements of powered device 16, up converter 10, e.g., LTC3402, is provided to additionally boost the output of DC/DC converter 9.

Power unit 1 further includes backup battery 14, e.g., a rechargeable battery, such as a Li-Ion battery, which is provided to assist fuel cell 8, as necessary, in order to ensure that powered device 16 is adequately supplied with energy. Backup battery 14 also provides power compensation and temperature regulation. In particular, when the temperature of fuel cell 8 becomes too high, e.g., 100° C., backup battery 14 can also be utilized as the power supply to powered device 16 in order to allow fuel cell 8 to cool down. In this way, backup battery 14 assists in preventing decomposition of the fuel cell and its electrodes. Moreover, when the ambient temperature is too low, e.g., −30° C., and/or when a low oxygen concentration condition occurs, e.g., 0%, on the fuel cell cathode, backup battery 14 can be utilized to supply the required voltage and current to powered device 16. Further, a heater 13, e.g., a 5W resistor with chemical isolation, coupled to fuel cell 8, is operated via current from backup battery 14, and a temperature sensor, e.g., a thermistor, is coupled to fuel cell 8 in order to monitor fuel cell temperature. Fuel cell heater 13 can be an electronic switch operated at low frequency that is fed by backup battery 14 and controlled by control unit 17. Further, heater 13 can be a resistive element located inside fuel cell 8 that is switched by a PWM (Pulse Width Modulation) signal, generated in control unit 17 that enables not only disabling and enabling the current, but also controlling the exact heating power.

As shown in FIG. 1, a backup battery charger 12 is positioned between DC/DC converter 9 and backup battery 14 in order to store excess fuel cell energy to backup battery 14 while backup battery 14 is in a standby condition.

In the event that the voltage output of backup battery 14 is insufficient to provide the necessary requirements of supplementing energy from fuel cell 8 or of supplying energy in lieu of fuel cell 8 to powered device 16, up converter 15, e.g., LTC3402, is provided to additionally boost the output of backup battery 14.

A dump resistor 11 is coupled to DC/DC converter 9 to absorb redundant power from fuel cell 8 to prevent standby effect, thereby prolonging the life expectancy of power unit 1.

Moreover, control unit 17 is provided as a communication interface between power unit 1 and powered device 16 or between power unit 1 and a host computer, e.g., a personal computer. Through control unit 17, information about fuel cell 8 and the state of power unit 1 can be forwarded to powered device 16, so that powered device 16 can act according to the received information. Moreover, control unit 17 can also be utilized to provide information from powered device 16 to power unit 1, so that power unit 1 can prepare for momentary power requirements of powered device 16. Further, because power unit 1 and powered device 16 can pass information and commands to each other through control unit 17, both these devices have improved functionality. It is further noted that host computer 2 can store software related to particular powered devices that can be downloaded to power unit 1 through control unit 17. In particular, this software can be utilized in power unit 1 to change various parameters and to log operation status, such as error states.

Control unit 17 is also coupled to each of DC/DC converter 9, up converter 10, backup battery 14, up converter 15, backup battery charger 12, dump resistor 11, and the fuel temperature sensor of fuel cell 8. In this way, control unit 17 performs system monitoring and control, power regulation and compensation, fuel cell output (voltage, current, and power) regulation, and temperature regulation.

Figure 3:
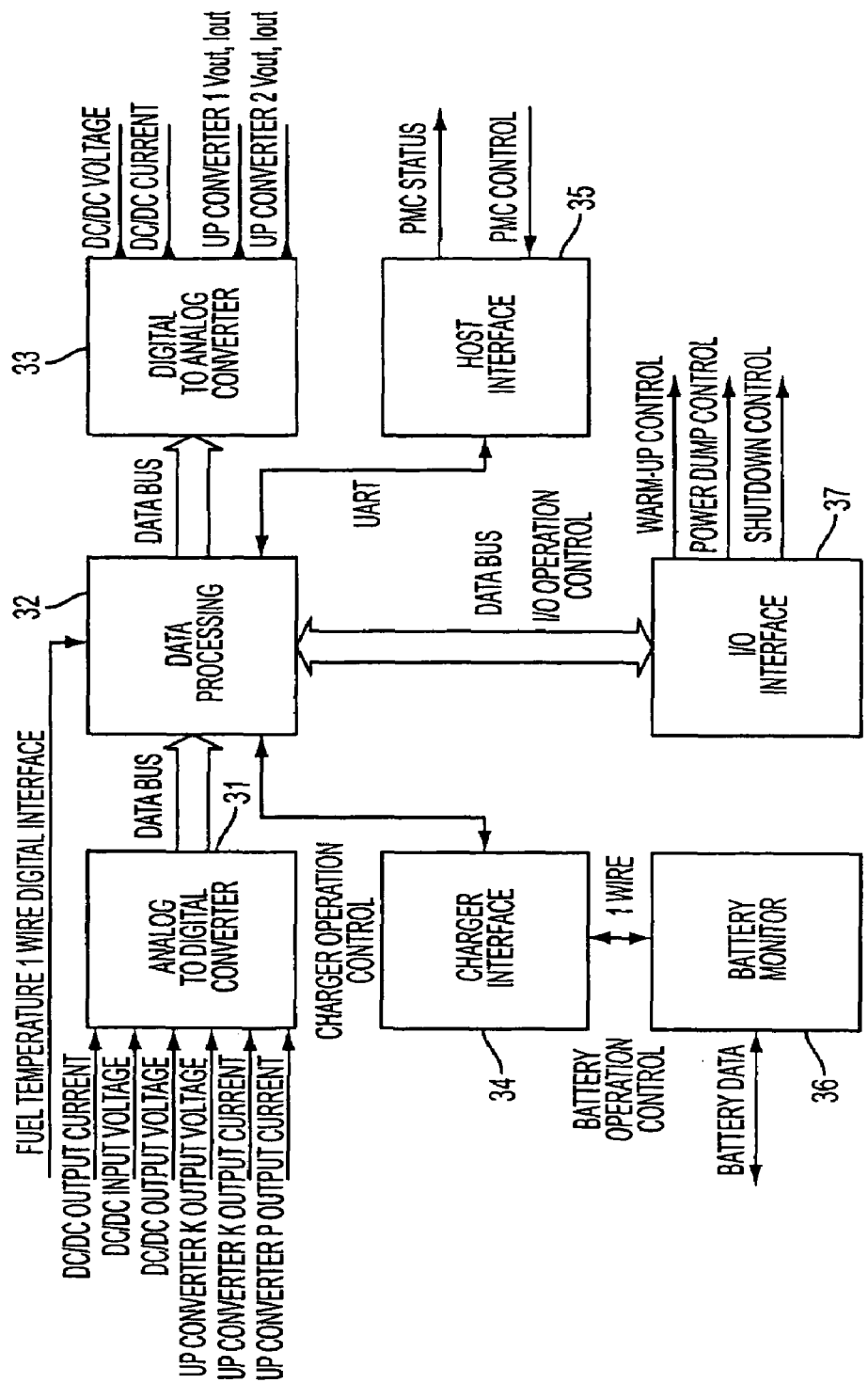
FIG. 3 schematically illustrates an exemplary arrangement of the control unit depicted in FIG. 1.

FIG. 3 schematically illustrates control unit 17. In particular, an A/D converter 31, e.g., MSP430F149, is arranged to receive inputs from DC/DC converter 9, up converter 10 and up converter 15. In particular, the input and output voltages and output current of DC/DC converter 9, the output voltage and current of up converter 10 and output current of up converter 15 are provided, e.g., over a data bus, as inputs to A/D converter 31. The converted data is forwarded, e.g., over a data bus, to data processor 32, e.g., MSP430F149, which stores the software for regulating and controlling power unit 1 for the specific powered device 16 currently in use. A D/A converter 33, e.g., MAX5741, is arranged to receive, e.g., over a data bus, commands from data processor 32 and outputs reference signals for output current control and output voltage control of DC/DC converter 9 and reference signals for output current control and output voltage control of up converter 10 and up converter 15. Thus, power control functions for power unit 1 are managed by the analog signals generated by D/A converter 33 and output lines of control unit 17.

Data processor 32 can also receive data from and transmit data to battery charger interface 34, host interface 35, and input/output interface 37. Data processor 32 also receives a signal from the fuel cell temperature sensor. Battery charger interface 34 communicates with battery monitor 36, e.g., DS276BE, which is arranged to receive/transmit battery data. In this manner, data processor 32 monitors battery status in order to protect the battery from over current, over temperature, and over voltage conditions, and controls the charging current and voltage, which will be defined by the battery status and conditions of fuel cell 8 and powered device 16. In this way, control unit 17 controls backup battery 14 to store energy when needed and to supply energy when needed. Input/output interface 37, coupled to data processor 32 over, e.g., a data bus, can issue control commands regarding warm-up control, power dump control, and shutdown control, and can be utilized for debugging. Host interface 35, e.g., a serial interface such as RS232, enables communication between power unit 1 and a host computer over, e.g., a UART. In this way, two-way communication of commands and statuses can be passed between powered device 16 and power unit 1 in order to receive commands and statuses regarding powered device 16, to control configuration changes, to receive error reports, to modify software/operating parameters, and to view and save data. Further, power unit 1 can request, e.g., that powered device 16 lower its power consumption, and powered unit 16 can inform power unit 1, e.g., to be prepared for momentary power requirements, such as a high current pulse with a certain time duration. It is noted that this these requests can be forwarded, e.g., over an SM bus, in which powered device 16 includes software to provide/request the various information to/from power unit 1, and the software in power unit 1 is designed to cooperate with the software of powered device 16.

In operation, control unit 17 is arranged to measure the temperature of fuel cell 8, and to compare the measured temperature with a threshold value. Moreover, when the measured temperature is outside of the threshold value, control unit 17 increases or decreases the load on fuel cell 8 to correct the temperature. By way of example, control unit 17 can activate heater 13 through backup battery 14 in order to heat fuel cell 8 up to an acceptable temperature. Further, the power supply function of fuel cell 8 can be diverted to backup battery 14 in order to allow fuel cell 8 to cool down. In this regard, it is noted that, depending on the powered device 16 currently in use, the various required thresholds, which depend upon the specific requirements of the powered device, may be different. As noted above, the necessary parameters for the powered device can be input to power unit 1 from a host computer so that the necessary thresholds can be adjusted for the proper control and regulation of power unit 1.

Control unit 17 is also arranged to measure or calculate the fuel cell voltage, current, or power and to compare one of these values to a threshold value. Control unit 17 also defines a maximum voltage, a minimum current, or a minimum power required for optimum fuel cell operation. In this way, control unit 17 utilizes the collected information about fuel cell temperature, fuel cell output voltage, DC/DC converter output voltage and current, backup battery voltage, and input and output current in order to optimize operation of fuel cell 8 according to the required parameters of powered device 16. For example, control unit 17 can calculate the fuel cell operation time and decide which and to what level to change a parameter, and perform the parameter change.

According to the invention, control unit 17 can adjust a maximum output current, Iout-max, as well as the output voltage, Vout. Further, if Vout is smaller than a defined level, control unit 17 can turn on up converter 15. The output current for up converter 15 (Ibat.out) can be determined, e.g., by the following equation:

$$I_{bat.out} = I_{out\text{-}max} - I_{dc/dc\text{-}out}$$

During operation of up converter 15, charging of backup battery 14 is halted.

When the input voltage of DC/DC converter 9 is within a defined range, control unit 17 can change the maximum level of the output current of DC/DC converter 9, i.e., to powered device 16 and to backup battery 14 according to, e.g., the following equation:

$$Iout = I1 * Vin * \eta / V1$$

in which, I1 represents a defined level of the current (Iin) of fuel cell 8; Vin represents the voltage of fuel cell 8; η represents a defined value; and V1 represents the required level of the output voltage (Vout), In a situation in which Iout is smaller than a defined value, Vout is larger than a defined value, and Vin is larger than a defined value, backup battery charger 12 will provide charging current according to, e.g., the following equation:

$$Ibat\text{-}char = I1 - Idc/dc\ out$$

in which I1 represents a current defined value. When Vout is smaller than another defined value, backup battery charger 12 will stop charging immediately.

Further, when the inner temperature of fuel cell 8 decreases below a certain level, current from backup battery 14 will flow through heater 13 until the fuel cell temperature rises above the certain level. In this regard, two heating current values can be utilized, e.g., one during start up of power unit 1 and one for normal operation. It is also noted that it can be a priority of backup battery 14 to provide energy to powered device 16 rather than power to heater 13. Moreover, when the inner temperature of fuel cell 8 increases above a defined level, the maximum level of the output current (current limit) can be reduced as a function of the fuel cell temperature. When compensation is being made to adjust the fuel cell temperature, it may be desirable not to supply backup battery current to any other targets.

Control unit 17 can also operate up converter 15 to providing current to powered device 16 until the inner temperature of fuel cell 8 drops back to a second defined value. Accordingly, up converter 15 can supply powered device 16 with supplementary current in order to keep the output voltage level.

Given a situation in which powered device 16 consumption drops below a defined minimum current level, backup battery 14 is fully charged, and Vin is larger than a minimum defined level, the internal load or dump is activated by control unit 17 to consume a defined maximum power from DC/DC converter 9. Further, control unit 17 can supply the dump complementary power in order to keep the DC/DC Converter power consumption at no more than the defined maximum power. However, in the event that the voltage of backup battery 14 drops below a minimum defined value, control unit 17 will stop any current consumption from backup battery 14.

Power unit 1 can operate in one of three distinct modes: voltage mode, current mode, and power mode, in which the voltage mode is the preferable standard operating mode.

In voltage mode, output voltage is a defined voltage and the output current is less than a predefined maximum value. Thus, a constant level of fuel cell output voltage is maintained by keeping the DC/DC converter 9 input voltage level within a target voltage. If the fuel cell voltage, i.e., the input voltage to DC/DC converter 9, is higher than a required level, then more current will be drawn from fuel cell 8, e.g., through activating the dump, until the voltage decreases to the required level. When the fuel cell voltage is lower than the required, then control unit 17 can reduce the current limit, such that the DC/DC current consumption from fuel cell 8 will be reduced, and direct backup battery 14 to supply complementary current until the fuel cell voltage increases to the required level.

In current mode, the converter supplies constant current, equal to the maximum value, while the voltage is less than the defined value. Current mode is selected when the load exceeds the limit. Thus, the fuel cell output current is maintained above a predetermined minimum. When the total consumption of current from the fuel cell is below a minimum level, current consumption will be supplemented, e.g., through activating the dump. When current consumption from the fuel cell requires reduction to below a specified level, current consumption from fuel cell 8 is reduced and complementary current is drawn from backup battery 14. Further, in this mode, temperature testing is done, and appropriate action is taken to compensate for too high or too low measured temperatures.

In power mode, the fuel cell output power is maintained above a predetermined minimum. When the total power consumption from the fuel cell is less than a required power, power consumption from fuel cell 8 will be supplemented to a required power, e.g., by activating the dump. When power consumption from the fuel cell requires reduction to below a specified level, power consumption from fuel cell 8 is reduced and complementary current is drawn from backup battery 14. Further, in this mode, temperature testing is done, and appropriate action is taken to compensate for too high or too low measured temperatures. Further, when current consumption by powered device 16 is less than the minimum defined current value, backup battery 14 is fully charged, the voltage of fuel cell 8 is over a define voltage, and the inner temperature of fuel cell is in a required range, DC/DC converter 9 provides power at a defined level to the internal load, and the provided power level is determined by constant power or voltage or current maintenance.

In operating in these various modes, consumption current and charging current are calculated, as is the DC/DC current limit. Power unit 1 can also test to determine whether powered device 16 is operating, i.e., consuming current. Moreover, when the fuel cell output voltage is too low, fuel cell current consumption can be reduced to 0 and all current can be drawn from backup battery 14.

Power unit 1 can operate in the above-noted operating modes through software resident, e.g., in control unit 17. As noted above, the software is generally directed to the specific powered device 16 in operation, which includes the various predetermined levels and parameters associated with the specific powered device. Exemplary software for operating power unit 1 is shown in FIG. 4.

Figure 4:
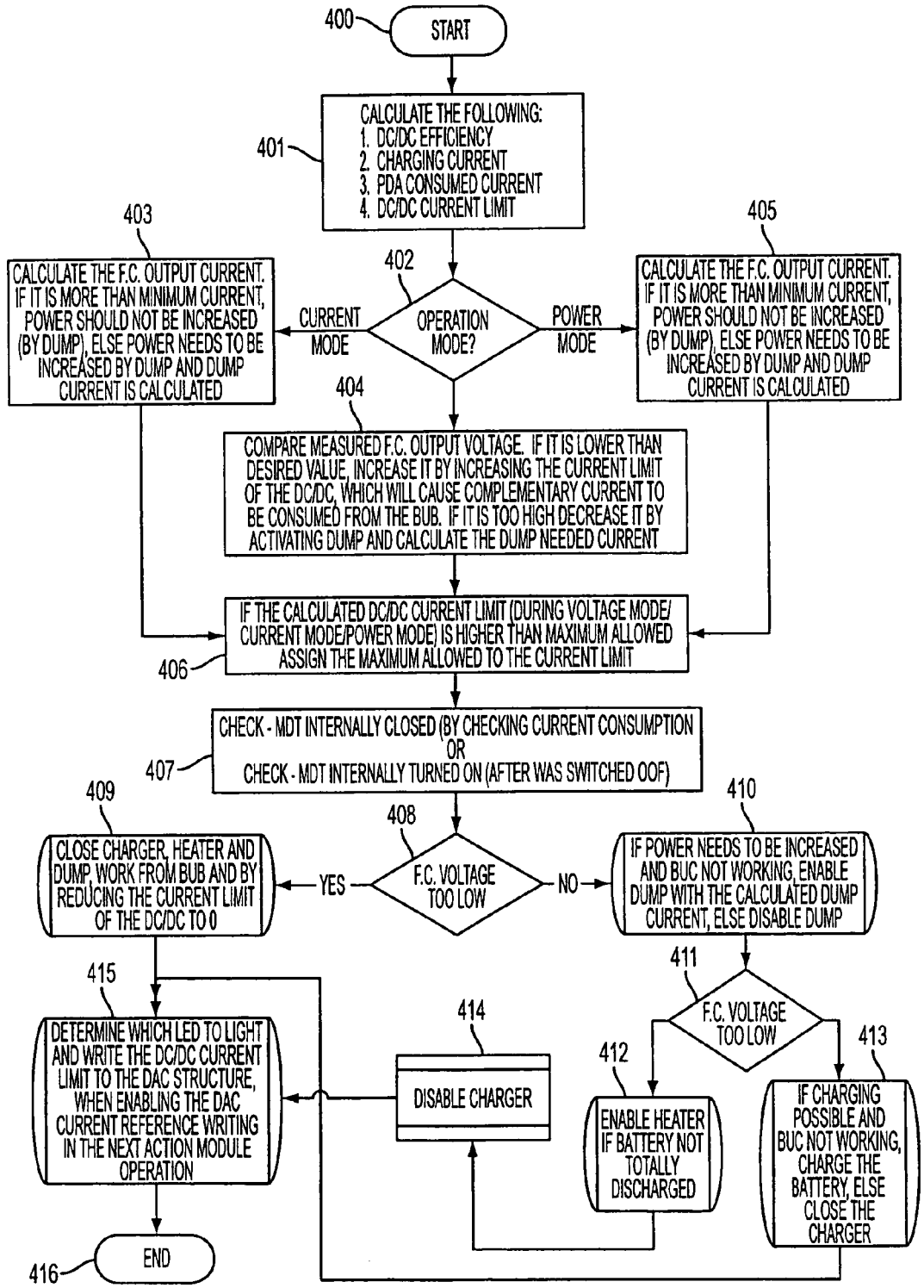
FIG. 4 illustrates an exemplary flow chart for operating the power unit of the instant invention.

As shown in FIG. 4, an instruction is received at 400 to start this software, and DC/DC efficiency, charging current, current consumed by powered device 16, and DC/DC current limit are calculated at 401. At 402, a decision regarding whether to operate in current mode at 403, voltage mode at 404, or power mode at 405 is made.

When current mode 403 is opted, fuel cell output current is calculated. If the calculated fuel cell output current is more than a minimum current, power should not be increased by activating the dump. Otherwise, power should be increased by the dump, and dump current should be calculated. In voltage mode 404, fuel cell output voltage is measured and compared to a predetermined value. If the measured level is lower than the predetermined value, the current limit of DC/DC converter 9 is increased in order to cause complementary current to be consumed from backup battery 14. If the measured level is too high, the dump is activated and current needed by the dump is calculated. In power mode 405, fuel cell output power is calculated. If the calculated fuel cell power is more than a minimum power, power should not be increased by activating the dump. Otherwise, power should be increased by the dump, and dump current is calculated.

Each of modes 403, 404, and 405 subsequently determine whether the calculated DC/DC current limit is higher than an allowable maximum, the allowable maximum is assigned as the DC/DC current limit in 406. In 407, a check is made by current consumption checking to determine whether powered device 16 was internally closed, or whether it was turned on after being switched off.

A determination is made whether the fuel cell voltage is too low at 408. If it is determined that the voltage is too low, the charger, heater and dump are turned off, DC/DC current limit is set to 0, and the backup battery is activated to supply the necessary energy to powered device 16 at 409. A determination is then made at 415 to activate an informational signal/warning, e.g., LED, to the user and to write the DC/DC current limit to D/A converter 33, enabling the D/A converter current reference writing in the next operation of the software. The software terminates at 416, and will be rerun at predetermined intervals to ensure the proper operation of the fuel cell and powered device.

When fuel cell voltage is not too low, a determination is made at 410 whether power needs to be decreased and whether the backup battery charger is working. If so, the dump is enabled with the calculated dump current. If not, the dump is disabled. Subsequently, a temperature determination is made at 411. If the temperature is too low, the heater is enabled at 412, if the backup battery is not totally discharged. At 414, backup battery charger 12 is disabled, and the program then goes to 415 to activate an informational signal/warning, e.g., LED, to the user and to write the DC/DC current limit to D/A converter 33, enabling the D/A converter current reference writing in the next operation of the software. The software terminates at 416, and will be rerun at predetermined intervals to ensure the proper operation of the fuel cell and powered device. If the temperature at 411 is not too low, a determination is made whether charging of backup battery 14 is possible and whether backup battery charger 12 is not operating at 413. In this event, backup battery 14 is charged. Otherwise, backup battery charger 12 is turned off. The program then goes to 415 to activate an informational signal/warning, e.g., LED, to the user and to write the DC/DC current limit to D/A converter 33, enabling the D/A converter current reference writing in the next operation of the software. The software terminates at 416, and will be rerun at predetermined intervals to ensure the proper operation of the fuel cell and powered device.

Of course, this exemplary software is provided for the purpose of illustration, and, depending upon the manufacture's requirements of the specific powered device, the software should be modified to control the fuel cell in accordance with the requirements of the specified powered device. Moreover, it is noted that, through the instant exemplary software and the instant disclosure, that one ordinarily skilled in the art would be readily able produce the necessary software to operate in conjunction with the disclosed power unit.

As noted above, several indicators, e.g., visual indicators such as LEDs, can be included in power unit 1 in order to inform/alert the user of the status of power unit 1 and fuel cell 8. moreover, the indicators can be discernable by, e.g., different colors to alter the user to different statuses of power unit 1 and fuel cell 8.

When power unit 1 is turned off, e.g., by an on/off switch, the working protocol of power unit 1 remains, except that the power unit output is disconnected and heating is disabled. A visual indication of the power off condition can be provided.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An power unit for an electronic device comprising:
   a fuel cell having a low output voltage between 0.3 and 1 V;
   a conversion device coupled to said fuel cell to convert an input voltage as low as 0.3 V to a higher output voltage to operate the electronic device;
   a control unit structured and arranged to control operation of said conversion device; and
   a dump resistor coupled to said conversion device that is structured and arranged to consume additional load from said fuel cell, wherein said control unit is coupled to said dump in order to control and regulate operation of said converter.

2. A power unit for an electronic device, comprising:
   a fuel cell;
   a control unit structured and arranged to control and regulate said fuel cell;
   a communication interface structured to provide two-way communication between said control unit and the electronic device; and
   a dump resistor coupled to said conversion device that is structured and arranged to consume additional load from said fuel cell,
   wherein said fuel cell is an individual fuel cell having a low voltage of between 0.3 and 1V, said power unit further comprises a conversion device coupled to said fuel cell to convert an input voltage from said fuel cell as low as 0.3 V to a higher output voltage to operate the electronic device, and
   wherein said control unit is coupled to said dump in order to control and regulate operation of said converter.

* * * * *